Patented Jan. 19, 1954

2,666,788

UNITED STATES PATENT OFFICE 2,666,788

PRODUCTION OF ETHYLENE SULFARYLAMIDES

Friedrich Ebel, Mannheim-Feudenheim, Germany, assignor to Badische Anilin- & Soda-Fabrik Aktiengesellschaft, Ludwigshafen am Rhine, Germany No Drawing. Application March 10, 1951,
Serial No. 215,008

Claims priority, application Germany
March 15, 1950

4 Claims. (Cl. 260—556)

This invention relates to a process for the production of ethylene sulfarylamides, i. e. ethylene sulfonic acid arylamides.

The so-called ethylene sulfarylamides $$(H_2C=CH-SO_2-NR_2)$$

have hitherto only been prepared by troublesome methods from difficultly accessible initial materials and with poor yields. They have been obtained in moderate yields for example by the reaction of 1-chloroethane 2-sulfochloride or ethane-1,2-disulfochloride with arylamines ($HNR_2$). They have therefore found no technical interest hitherto.

I have now found that ethylene sulfarylamides are obtained in a simple manner and in very good yields by reacting the so-called carbyl sulfate with primary or secondary amines and allowing basic substances to act on the resulting compounds.

Carbyl sulfate is known to be formed by the reaction of ethylene with two equivalents of sulfur trioxide and has the constitution:

Suitable aromatic amines are, for example, aniline, and its nuclear substitution products, e. g. the toluidines, halogen-anilines, nitroanilines, anisidines, phenetidines, aminobenzoic acid esters, aminoazobenzene and polynuclear amines such as the naphthylamines, benzidine. The N-monoalkyl and -aryl derivatives of these aromatic amines, such as N-methylaniline, N-benzylaniline, diphenylamine, carbazole or tetrahydroquinoline may also be used as starting materials.

If two equivalents of these amines per molecule of carbyl sulfate are used, then arylammonium salts of ethionic acid sulfarylamides are obtained by opening of the anhydride-like ring of the carbyl sulfate and addition of the two amine molecules, for example according to the equation:

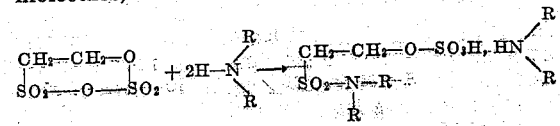

It is also possible to proceed by using only one equivalent of the primary or secondary aromatic amine for each molecule of carbyl sulfate, provided that the second equivalent is replaced by an equivalent of any tertiary amine, as for example trimethylamine, dimethylaniline, pyridine, or quinoline. There is then obtained an analogous salt-like product which likewise contains the primary or secondary amine in sulfarylamide linkage but the tertiary amine in ammonium linkage.

The said reaction of carbyl sulfate with the amines takes place already at room temperature or at moderately elevated temperature depending on the nature of the amine. It is therefore unnecessary to work at higher temperatures. The employment of solvents or diluents is often preferable. As such there may be used for example benzene, carbon tetrachloride or carbon disulfide, it being recommended that the carbyl sulfate which is difficultly soluble in these agents should be used in finely ground form and stirred well during the reaction.

After all the carbyl sulfate has been reacted, the resulting ammonium-salt-like product is treated with basic or acid-binding substances, as for example alkali or alkaline earth metal hydroxides or carbonates, borates, silicates, phosphates or sulfides, ammonia, amines or quaternary ammonium bases. There may also preferably be used an excess of the amines used for the abovementioned reactions.

In this way the ammonium salt-like intermediate product is split up into the desired ethylene sulfarylamide and sulfuric acid in the form of a salt thereof the amine previously in ammonium linkage being set free; for example when employing caustic soda, according to the equation:

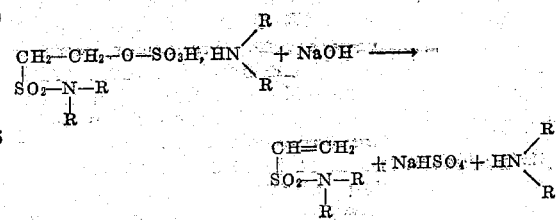

When using strong bases such as caustic soda solution this splitting up takes place rapidly at room temperature; when using weaker bases, heating might become necessary. When an insufficient amount of solvent or no solvent is present, the ethylene sulfarylamide formed separates directly in oily or crystalline form; in other cases it may be easily recovered by evaporation of the solvent and neutralisation of the amine set free or employed in excess with acid.

The ethylene sulfarylamides thus obtained readily in excellent yields and in a state of great purity are neutral substances when they contain no acid or basic groups and no hydrogen atoms on the arylamide nitrogen atom. The ethylene sulfarylamides having the grouping $-SO_2-NH-$ prepared from primary aromatic amines are, like all such compounds, soluble in strong alkalies.

The ethylene sulfarylamides are valuable intermediate products, for example for synthetic substances, dyestuffs and textile assistant and pest combatting agents.

The following examples will further illustrate this invention but the invention is not limited to these examples. The parts are by weight.

*Example 1*

10 parts of carbyl sulfate are ground in a ball mill at room temperature for 2 to 3 hours with 30 parts of benzene and 10 parts of aniline. To the resulting pulp there are added in the mill 85 parts of 2N caustic soda solution and grinding is continued for an hour. The aqueous-alkaline layer is then separated from the benzene layer, filtered if necessary, and then acidified with 16.5 parts of 5N hydrochloric acid. The precipitated oil solidifies to crystals after a short time. The crystals are melted under water in order to remove all inorganic contaminants. Ethylene sulfanilide ($CH_2=CH.SO_2.NH.C_6H_5$) is thus obtained in the form of pale brownish coloured crystals having a melting point of 69° to 72° C. The yield is 75 to 90% of the theoretical yield, depending on the quality of the carbyl sulfate. Purification is best effected by recrystallisation from toluene or aqueous ethyl alcohol. Thus purified it forms colourless crystals having a melting point of 71° C. The ethylene sulfanilide may also be distilled; it boils at 174° C. under 1 mm. pressure (mercury gauge) but sometimes vigorous decomposition occurs.

The solubility of the ethylene sulfarylamide in water amounts to 0.58 gram in 100 grams of solution at 20° C. It is only slightly better soluble in aqueous alkali carbonate or in aqueous ammonia, but dissolves well in caustic alkali solutions. The sodium salt separates from strong caustic soda solution in the form of glittering leafy crystals.

*Example 2*

10 parts of carbyl sulfate in 60 parts of benzene are ground in a ball mill for 3 hours at room temperature with 15 parts of beta-naphthylamine. 85 parts of 2N caustic soda solution are then added and the grinding is continued for another 6 hours. The pulp formed is heated for a short time at 60° to 70° C., the effect being that it separates into two layers. The upper benzene layer contains mainly the naphthylamine which has not been combined as sulfamide, and the aqueous layer contains, besides the sodium derivative of ethylene sulfo-beta-naphthylamide, a little benzene and naphthylamine in solution. It is blown with air or nitrogen, filtered and acidified with 16.5 parts of 5N hydrochloric acid. The ethylene sulfo-beta-naphthylamide ($CH_2=CH.SO_2.NH.C_{10}H_7$)

is thus precipitated in crystalline form. The yield amounts to 80% of the theoretical yield calculated on the naphthylamine which has entered into reaction.

The ethylene sulfo-beta-naphthylamide may be recrystallised from aqueous alcohol and then forms colourless glittering crystals having a melting point of 90° to 91° C.

*Example 3*

10 parts of carbyl sulfate, 30 parts of benzene and 11.5 parts of para-toluidine are reacted as described in Example 1. 85 parts of 2N caustic soda solution are added and, when the decomposition of the intermediate product is completed, the benzene layer is separated from the aqueous layer. By acidifying the aqueous layer with 16.5 parts of 5N hydrochloric acid, the ethylene sulfo-para-toluidide

formed separates at first as an oil. After it has become crystalline, it is filtered off by suction melted under water and dried. The crude product melts at 70° C. After recrystallisation from toluene, the melting point rises to 78°–79° C.

*Example 4*

From 10 parts of carbyl sulfate and 14.7 parts of para-phenetidine there is obtained in the manner described in Example 3 ethylene sulfo-para-phenetidide ($CH_2=CH.SO_2.NH.C_6H_4-OC_2H_5$) which, after recrystallisation from toluene, melts at 85° to 86° C.

*Example 5*

10 parts of carbyl sulfate and 275 parts of benzene are ground for 3 hours at room temperature with 14.8 parts of meta-nitraniline. 85 parts of 2N caustic soda solution are added to the resulting pulp while stirring and the whole is allowed to stand until the mixture separates into two layers. After separating the benzene layer which contains the recovered meta-nitraniline, the aqueous layer is blown with air until it is free from benzene. In this way there is precipitated a considerable amount of a yellow-brown crystalline substance which is probably the sodium derivative of ethylene sulfonic acid-meta-nitranilide:

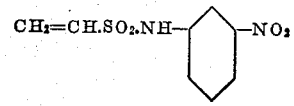

Without filtering it off, the mixture is acidified with 16.5 parts of 5N hydrochloric acid. An oil is thus formed which becomes solid after some time. It is filtered off by suction and purified by recrystallisation from water or toluene. The ethylene sulfo-meta-nitranilide thus purified forms yellowish crystals having a melting point of 120° to 122° C.

*Example 6*

10 parts of carbyl sulfate are ground for 3 hours with 50 parts of benzene and 17.5 parts of para-aminobenzoic acid ethyl ester. 106 parts of 2N caustic soda solution are added and the whole ground for another 2 hours. Finally the reaction mixture is separated into two layers by heating for a short time. The aqueous layer is blown with air, filtered and acidified with 106 parts of 3N hydrochloric acid. The free para-(ethylene-sulfamido)-benzoic acid ($CH_2=CH.SO_2.NH-C_6H_4-COOH$)

formed by simultaneous saponification separates as a rapidly-crystallising oil. By recrystallisation from water it is obtained in the form of glittering colourless leafy crystals having a melting point of 195° C.

The excess para-aminobenzoic acid ethyl ester is recovered from the benzene layer and used again.

*Example 7*

10 parts of carbyl sulfate, 200 parts of benzene and 21 parts of para-aminoazobenzene are ground for 3 hours. The resulting pulp is mixed with 85 parts of 2N caustic soda solution and, after grinding for a further 2 hours, is separated into two layers by heating for a short time. Crystals of aminoazobenzene collect between the two liquid layers. These, and the benzene layer which contains the remainder of the excess aminoazobenzene, are separated. The aqueous layer is freed from benzene by blowing and from small amounts of precipitated aminoazobenzene by filtration. A yellow solution is thus obtained which contains the sodium derivative of para-(ethylene-sulfamido)-azobenzene

It is acidified with acetic acid until the colour has changed from yellow to red, the free para-(ethylenesulfamido)-azobenzene thus being obtained. After recrystallisation from toluene, it forms beautiful brown-yellow crystals having a melting point of 159° to 160° C.

*Example 8*

10 parts of carbyl sulfate are ground for 2 hours with 30 parts of benzene and 11 parts of N-methylaniline. The oily reaction product is separated into two layers by the addition of 85 parts of 2N caustic soda solution. The aqueous layer is separated and the benzene layer extracted with 10% hydrochloric acid until a sample of the extract no longer becomes turbid on the addition of caustic soda solution. The benzene layer is then washed with water until free from acid. By expelling the benzene, N-methyl-ethylenesulfanilide $CH_2=CH.SO_2.N(CH_3)-C_6H_5$ remains behind as an oil which solidifies to crystals after a short time. It recrystallises from toluene to give colourless leaflets having a melting point of 79° to 80° C.

*Example 9*

10 parts of benzidine are dissolved in 180 parts of benzene and caused to precipitate in finely-grained form by rapid cooling and vigorous movement. 10 parts of carbyl sulfate are then added and the whole is ground for 5 hours at room temperature in a ball mill; the reaction mixture is then boiled for 2 hours on the waterbath. After cooling, 120 parts of 2N caustic soda solution are added and the whole ground for a further 7 hours. The mixture is separated into two layers by heating for a short time on the waterbath. The benzene layer contains the excess benzidine. The aqueous layer is blown with air, filtered and acidified with 10% hydrochloric acid. The precipitate thus obtained yields, after recrystallisation from trichlorbenzene, colourless, well-formed crystals of bis-(ethylenesulfonyl)-benzidine

having a melting point of 172° to 176° C.

What I claim is:

1. A process for the production of ethylene sulfanilide which consists in milling at ordinary temperature a mixture of carbyl sulfate and at least two equivalents of aniline in the presence of an inert diluent, treating the reaction mixture with an excess of an aqueous caustic alkali solution and acidifying the aqueous alkaline solution so obtained.

2. A process for the production of N-methyl-ethylene-sulfanilide which consists in milling at ordinary temperature a mixture of carbyl sulfate and at least two equivalents of N-methyl aniline in the presence of an inert diluent, treating the reaction mixture with an excess of an aqueous caustic alkali solution and acidifying the aqueous alkaline solution so obtained.

3. A process for the production of ethylene sulfonic acid meta-nitroanilide which consists in milling at ordinary temperature a mixture of carbyl sulfate and at least two equivalents of meta-nitroaniline in the presence of an inert diluent, treating the reaction mixture with an excess of an aqueous caustic alkali solution and acidifying the aqueous alkaline solution so obtained.

4. A process for the production of ethylene sulfonic acid arylamides which comprises milling at ordinary temperature a mixture of carbyl sulfate with a member of the group consisting of aniline, its N- and C-monomethyl substitution products, the C-ethoxy-, -nitro-, -carbethoxy- and -phenylazoanilines, the naphthylamines and benzidine, treating the reaction products with an excess of an aqueous caustic alkali solution and acidifying the aqueous alkaline solution so obtained.

FRIEDRICH EBEL.

References Cited in the file of this patent

UNITED STATES PATENTS

| Number | Name | Date |
|---|---|---|
| 2,245,535 | Stallman et al. | June 10, 1941 |
| 2,527,300 | Dudley | Oct. 24, 1950 |
| 2,566,810 | Smith | Sept. 4, 1951 |

FOREIGN PATENTS

| Number | Country | Date |
|---|---|---|
| 507,339 | Great Britain | June 14, 1939 |

OTHER REFERENCES

Autrieth et al., "Ber. Deut. Chem.," vol. 36 (1903). pp. 3629–31.